Patented Jan. 8, 1946

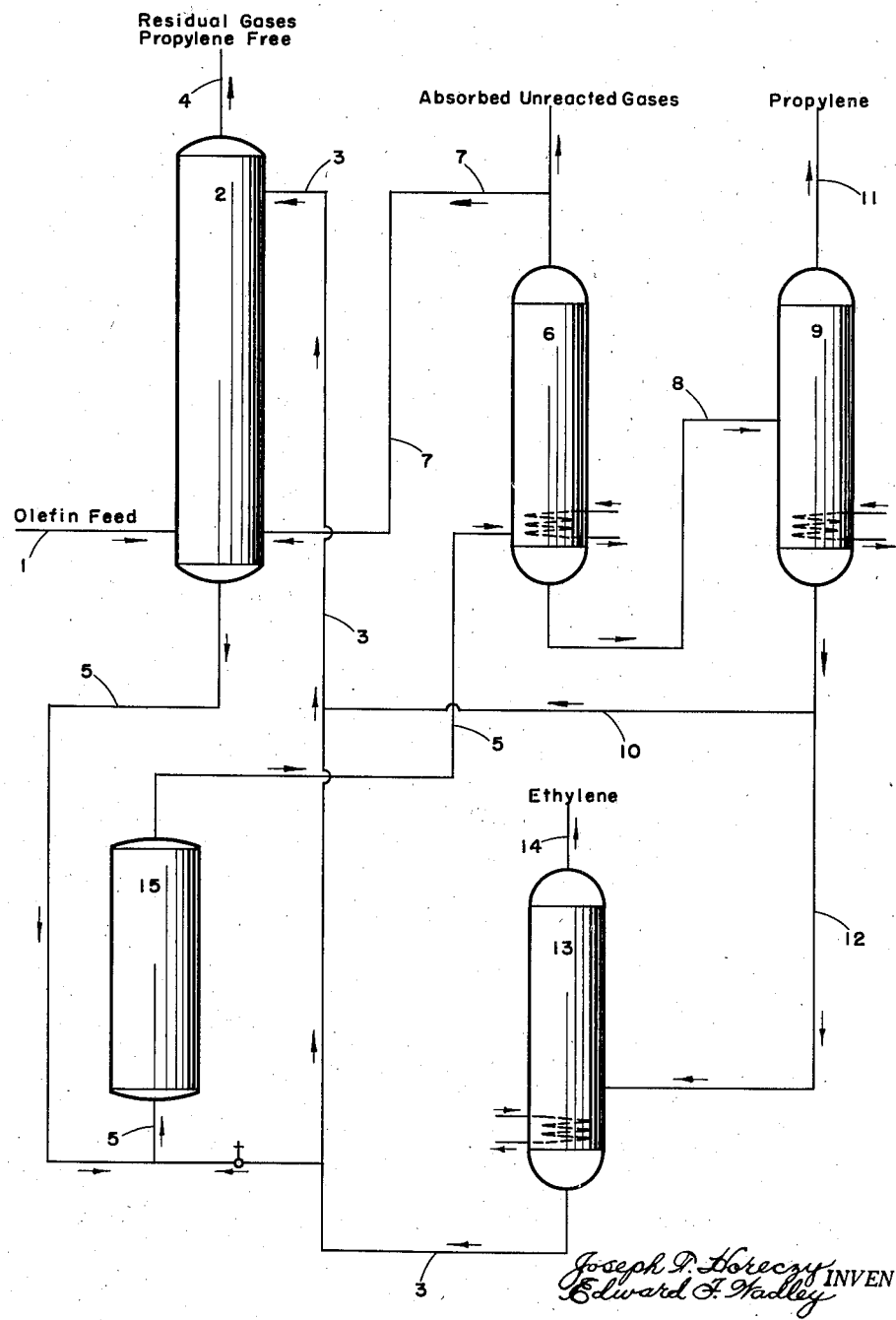

2,392,740

UNITED STATES PATENT OFFICE 2,392,740

SEPARATION OF OLEFINS

Joseph T. Horeczy and Edward F. Wadley, Baytown, Tex., assignors to Standard Oil Development Company, a corporation of Delaware Application October 2, 1944, Serial No. 556,744

5 Claims. (Cl. 260—677)

The present invention is directed to a method for separating ethylene from propylene in gases containing these constituents alone or in admixture with light paraffin hydrocarbons and hydrogen.

In the production of ethyl alcohol from ethylene, it is extremely undesirable to have any propylene present in admixture with the ethylene because this results in the simultaneous production of isopropyl alcohol, the separation of which from ethyl alcohol is practically impossible. One of the cheapest sources of ethylene is refinery gases. The ethylene in this source is usually in admixture with propylene and other gaseous hydrocarbons and hydrogen. Separation of ethylene from propylene by fractionation is extremely difficult and expensive.

The principal object of the present invention is the provision of a simple method for separating propylene from ethylene. Briefly, this method consists in passing a gas containing ethylene and propylene through a solution of iodine in a liquid solvent capable of dissolving or absorbing aliphatic hydrocarbons under conditions more suitable for the reaction of propylene with iodine than for the reaction of ethylene with iodine, and then decomposing the iodides retained in the solvent by the application of heat. In this method advantage is taken of the facts that propylene will react with iodine more rapidly and at lower temperatures than will ethylene, propylene iodide will decompose at a lower temperature than ethylene iodide and propylene will be dissolved or absorbed to a greater degree in a solvent for aliphatic hydrocarbons than will ethylene. In consequence of these three facts a substantially complete separation of propylene from ethylene can be realized by operating in accordance with the present invention.

The solvent utilized in the method of the present invention can be any solvent for aliphatics which is at the same time a solvent for iodine, such as aromatic hydrocarbons (toluene, styrene, α-methylnaphthalene, etc.), carbon bisulfide, etc. The higher the solvent power of the solvent for iodine, the more acceptable it is for use in the method of the present invention. Iodine concentrations of 25 grams per liter to 500 grams per liter of solution may be employed.

In the practice of the present invention the amount of iodine solution employed relative to the gases depends, among other things, upon the concentration of olefins in the gas, the concentration of iodine in the solution, contact time and pressure. In general, that amount of iodine solution should be employed which will insure an excess of iodine to propylene so that all the propylene will react. At the same time, too great an excess of iodine should be avoided in order to minimize reaction of ethylene therewith. A good ratio of iodine to propylene is from about 1.1 to 2 moles of iodine per mole of propylene. It is preferred to have a molar excess of 20% to 30% of iodine relative to the propylene.

The temperature at which the gases are contacted with the iodine solution is preferably maintained below about 90° F. Temperatures as high as 150° F., however, may be tolerated at certain pressures. While in the upper end of the range the selectivity of the reaction between iodine and the olefins is not so strongly in favor of propylene, this is compensated for to some extent by the decreased absorptivity of the solvent for ethylene at these higher temperatures. The pressure should be between about atmospheric and 125 pounds per square inch, although again higher pressures may be employed.

Further objects and advantages of the present invention will appear from the following detail description of the drawing, in which the single figure is a front elevation in diagrammatic form of a plant suitable for the practice of the present invention.

Referring to the drawing in detail, numeral 1 designates a feed line for olefin gases containing ethylene and propylene. Ordinarily, in refining operations, there will be introduced through this line a stream containing hydrogen, methane, ethane, ethylene, propane and propylene (C4 hydrocarbons may sometimes be included, although for best operation of this method it is preferred that the stock be debutanized first). The olefin-containing stream is discharged into the bottom of tower 2, into the top of which, through line 3, is introduced an iodine solution in a solvent which dissolves both iodine and aliphatic hydrocarbons. The tower 2 will ordinarily contain suitable interior contact equipment, such as bubble cap plates, disc and doughnut plates, Raschig rings, balls, or the like, to insure adequate contact between the olefinic gases and the solvent.

The residual gases pass out from the top of tower 2 through line 4. This tower is preferably operated under such conditions that the overhead stream will contain the major portion of the ethylene present in the charge and will not be contaminated with propylene, since all the propylene present in the charge will either have reacted with iodine or dissolved in the solvent. If a pure ethylene stream is desired, this overhead stream can be reprocessed in a similar tower under conditions favoring the reaction of ethylene with iodine to effect a separtion of the ethylene from the non-olefinic gases.

The bottoms from tower 2 are conducted by line 5 into a flash tower 6, where absorbed unreacted gases are liberated from the liquid carrier under conditions such that the iodides contained therein are not decomposed. These liberated gases will contain propylene and propane admixed with small amounts of ethane and ethylene and may be recycled to tower 2 through line 7 for further processing, or, if desired, may be removed from the system. To minimize the amount of material recycled through line 7, a soaking drum or time tank 15 may be provided in line 5 to provide adequate time of reaction of iodine with olefins dissolved in the iodine solution. If desired, additional fresh iodine solution from line 3 may be introduced into this time tank.

The solution of iodides is conducted from the bottom of tower 6 by line 8 to an intermediate portion of tower 9. This tower is maintained under conditions suitable for the decomposition of propylene iodide. The temperature at which this tower is maintained may be between about 125° and 350° F., and preferably somewhat below 250° F., depending on the pressure in order to insure that any ethylene iodide contained in the solvent will not decompose.

The regenerated iodine solution is returned from the bottom of tower 9 to line 3 by way of line 10, while the liberated propylene leaves the top of tower 9 through line 11. In order to prevent the building up of ethylene iodide in the iodine solution, the bottoms from tower 9 may be conducted by way of line 12 to a tower 13, which is maintained at a higher temperature than tower 9 sufficient to insure the decomposition of any ethylene iodide contained in the iodine solution. The temperature of this tower may be between about 250° and 500° F., and preferably in the neighborhood of 400° F. The residual iodine solution from the bottom of tower 13 is returned to tower 2 through line 3 while any liberated ethylene leaves the top of tower 13 through line 14.

In an operation in accordance with the present invention a gas mixture containing ethylene and propylene was contacted at room temperature under a pressure of 100 pounds per square inch with a toluene-iodine solution for 20 minutes. The iodine solution contained 155 grams of iodine per liter. The enriched solution was then desorbed of all dissolved gases and the iodide formed was decomposed by heating to a temperature of 210° F. The following table shows the results obtained:

| Gas charge | | Gas from decomposition of the iodide | |
| --- | --- | --- | --- |
| Component | Mole per cent | Component | Mole per cent |
| $C_2=$ | 4.5 | $C_2=$ | 0.6 |
| $C_3=$ | 85.3 | $C_3=$ | 98.4 |
| $C_3$ | 9.2 | $C_3$ | Nil |
| $C_4$ | 1.0 | $C_4+$ | 1.0 |

The nature and objects of the present invention having been thus described, what is claimed as new and useful and is desired to be secured by Letters Patent is:

1. A method for the separation of propylene from ethylene which comprises contacting a gas containing the two with a solution of iodine in a solvent capable of dissolving aliphatic hydrocarbons under conditions of temperature and pressure more favorable for the formation of propylene iodide than for ethylene iodide, separating the residual gas from said solution and subjecting said solution to condition suitable for the decomposition of propylene iodide.

2. A method for the separation of propylene from ethylene which comprises contacting a gas containing the two with a solution of iodine in a solvent capable of dissolving aliphatic hydrocarbons at a temperature below about 90° F. for a period of time sufficient for a reaction of propylene with the iodine, separating the residual gas from said solution and subjecting said solution to conditions suitable for the decomposition of propylene iodide.

3. A method according to claim 1 in which the amount of iodine in the solution is from 1.1 to 2 moles per mole of propylene in the gas to be treated.

4. A method according to claim 2 in which the amount of iodine in the solution is from 1.1 to 2 moles per mole of propylene in the gas to be treated.

5. A method for the separation of propylene from ethylene which comprises establishing a circulating stream of a solution of iodine in a solvent capable of dissolving aliphatic hydrocarbons, maintaining a portion of said stream under conditions of temperature and pressure more favorable for the formation of propylene iodide than for ethylene iodide, maintaining a later portion of said stream under conditions of temperature and pressure suitable for the decomposition of propylene iodide, contacting a gas containing propylene and ethylene with said first portion of said stream for a period sufficient to effect reaction between the propylene and iodine, separating residual gas from said stream and recovering propylene from said later portion of said stream.

JOSEPH T. HORECZY.
EDWARD F. WADLEY.